United States Patent [19]

Hall et al.

[11] Patent Number: 5,179,469
[45] Date of Patent: Jan. 12, 1993

[54] BROAD BAND LIGHT ABSORBING FILM

[75] Inventors: Randolph L. Hall; William J. Gunning, both of Newbury Park, Calif.

[73] Assignee: Rockwell International Corporation, Seal Beach, Calif.

[21] Appl. No.: 856,597

[22] Filed: Mar. 24, 1992

[51] Int. Cl.$^5$ .............................................. G02B 5/22
[52] U.S. Cl. ................................... 359/360; 359/584; 359/585; 359/589; 359/884
[58] Field of Search ............... 359/359, 360, 584, 585, 359/589, 590, 884

[56] References Cited

U.S. PATENT DOCUMENTS

| 3,959,548 | 5/1976 | Bernal | 359/359 |
| 4,583,822 | 4/1986 | Southwell | |
| 4,925,259 | 5/1990 | Emmett | 359/359 |
| 4,934,788 | 6/1990 | Southwell | |
| 5,004,308 | 4/1991 | Hall et al. | |

Primary Examiner—Bruce Y. Arnold
Assistant Examiner—J. P. Ryan
Attorney, Agent, or Firm—John C. McFarren

[57] ABSTRACT

A thin film, light absorbing coating comprises an analog structure fabricated by the simultaneous codeposition of absorbing and non-absorbing material. The two materials may comprise a non-absorbing dielectric material, such as silicon monoxide, and a metal, such as chromium, that is absorbing over the desired wavelength range. Individual evaporation rates for the two materials are adjusted during the codeposition process to achieve a continuously graded quintic transition between the absorbing material and the non-absorbing material. The continuous grading of the composition allows good light absorption properties to be maintained over a wide range of wavelengths. The total design thickness of the absorbing coating is on the order of a full wavelength of light. All wavelengths of incident light shorter than the design wavelength are absorbed into the coating. The coating is useful as a broad band light absorbing layer between a substrate and a spectrally selective reflective surface layer.

17 Claims, 1 Drawing Sheet

BROAD BAND LIGHT ABSORBING FILM

TECHNICAL FIELD

The present invention relates to optical coatings and, in particular, to a thin film having a graded composition of materials for absorbing light over a wide range of wavelengths.

BACKGROUND OF THE INVENTION

In the field of optical devices, anti-reflective thin film coatings are well known for reducing or eliminating surface reflections from components such as lenses and filters, for example. Anti-reflective (AR) coatings are generally designed for efficient transmission of light through the coating and the associated optical component. For improved performance, anti-reflective films have been developed with a quintic refractive index profile, as described in U.S. Pat. No. 4,583,822 issued to Southwell, the teachings of which are incorporated herein by reference. Quintic anti-reflective films are fabricated with a refractive index profile so that the initial refractive index of the film is as close as possible to the refractive index of the incident medium and the final refractive index of the film is substantially the same as that of the substrate.

In contrast to lenses and filters, reflective surfaces such as mirrors are designed to reflect incident radiation. Spectrally selective coatings may be applied to substrates to form surfaces that reflect light only in specific, predetermined, narrow wavelength bands. In such spectrally selective reflective devices, however, a means is required for absorbing light not reflected (i.e., light that is transmitted) by the coating. In the prior art, standard AR coatings have been applied to the surface, but they are effective only for narrow wavelength bands. Multi-layer light absorbing films have also been used on chromium, for example, where an absorbing but not transparent coating is needed. Such layered coatings usually provide good absorption only over a rather narrow wavelength range. Typically, these coatings absorb light in the visible region where the human eye is sensitive. At longer wavelengths (i.e., mid- and long-wave infrared) these coatings become efficient reflective surfaces rather than absorbers. Therefore, what is needed is a thin film material that absorbs light effectively over a broad range of wavelengths without causing unwanted reflections.

SUMMARY OF THE INVENTION

Light absorbing coatings that are effective over a wide wavelength range must not have discrete interfaces, at least to the dimension of a wavelength of light. In one embodiment of the present invention, thin layers (i.e., less than the wavelength of light) that alternate between a non-absorbing material and an absorbing material are deposited on a substrate. For example, the two materials may comprise silicon monoxide (SiO), a non-absorbing material, and chromium (Cr), a metal that is absorbing over the wavelength range of interest. In applying the layers to the substrate, the Cr layers are relatively thick and the SiO layers are relatively thin. The SiO layers become progressively thicker and the Cr layers progressively thinner to achieve a quintic transition from the absorbing material into the non-absorbing material. This type of absorbing layer forms part of the rugate reflector described in U.S. Pat. No. 5,004,308 issued to Hall et al., the teachings of which are incorporated herein by reference.

In the preferred embodiment of the invention, the absorbing layer comprises an analog structure fabricated by the simultaneous codeposition of absorbing and non-absorbing material. The composition of the coating is continuously graded between the absorbing material (e.g., a metal) and the non-absorbing material (e.g., a dielectric). Individual evaporation rates for the two materials are adjusted during the codeposition process to achieve a continuously graded quintic transition. The continuous grading of the composition allows good light absorption properties to be maintained over a wide range of wavelengths. The total design thickness of the absorbing coating is on the order of a full wavelength of light. All wavelengths of incident light shorter than the design wavelength are absorbed into the coating.

A principal object of the invention is the absorption of a broad wavelength band of incident radiation. A feature of the invention is a light absorbing coating having a composition graded between an absorbing material and a non-absorbing material. An advantage of the invention is a thin film coating deposited on a substrate to absorb broad band light transmitted by a spectrally selective reflective surface layer.

BRIEF DESCRIPTION OF THE DRAWINGS

For a more complete understanding of the present invention and for further advantages thereof, the following Detailed Description of the Preferred Embodiment makes reference to the accompanying Drawings, in which.

DETAILED DESCRIPTION OF THE PREFERRED EMBODIMENTS

When spectrally selective films, such as rugate filters, for example, are applied to form reflective surfaces, the wavelengths of light not reflected (i.e., those wavelengths transmitted through the reflective film) must be absorbed by some means. The present invention comprises a thin film, broad band light absorbing layer of material that may be deposited, for example, between a supporting substrate and a reflective surface film. In this type of device, the absorbing layer prevents unwanted reflection of broad band light from a surface designed to reflect only narrow wavelength bands of light.

Fabrication of the thin film, broad band light absorbing coating of the present invention involves the simultaneous codeposition of absorbing and non-absorbing materials on a substrate. The codeposition of two or more materials on a substrate is well known and has been applied to non-absorbing optical coatings and metal alloys (see, for example, U.S. Pat. No. 4,934,788 issued to Southwell, the teachings of which are incorporated herein by reference). In the present invention, individual evaporation rates for the two materials are adjusted during the codeposition process to achieve a step-wise or a continuously graded quintic profile of light absorbing material. In the preferred embodiment, the composition of the light absorbing coating is graded continuously between the absorbing material (which may comprise a metal, for example) and the non-absorbing material (which may comprise a dielectric, for example). The total design thickness of the absorbing coating is on the order of a full wavelength of light. The quintic grading of the composition allows good light absorption to be maintained over a wide range of wavelengths. All wavelengths of incident light shorter than a design wavelength are absorbed into the coating.

During codeposition of the absorbing and non-absorbing materials on the substrate, the composition of the deposited material of the present invention begins with essentially pure absorbing material and ends with essentially pure non-absorbing material. The composition may be graded continuously in a quintic fashion, for example, such that the portion of the absorbing material is expressed by the following equation:

$$\text{Portion of absorbing material} = (10x^3 - 15x^4 + 6x^5)$$

where x is the relative distance into the coating, i.e., x equals 0 at the surface of the coating and x equals 1 at the substrate, such that $0 \leq x \leq 1$. The total thickness of the deposited light absorbing film is on the order of a full wavelength of light. As a reference, additional background information on step-wise quintic profiles for non-absorbing optical coatings may be found in U.S. Pat. No. 4,583,822 issued to Southwell.

Figure 1:
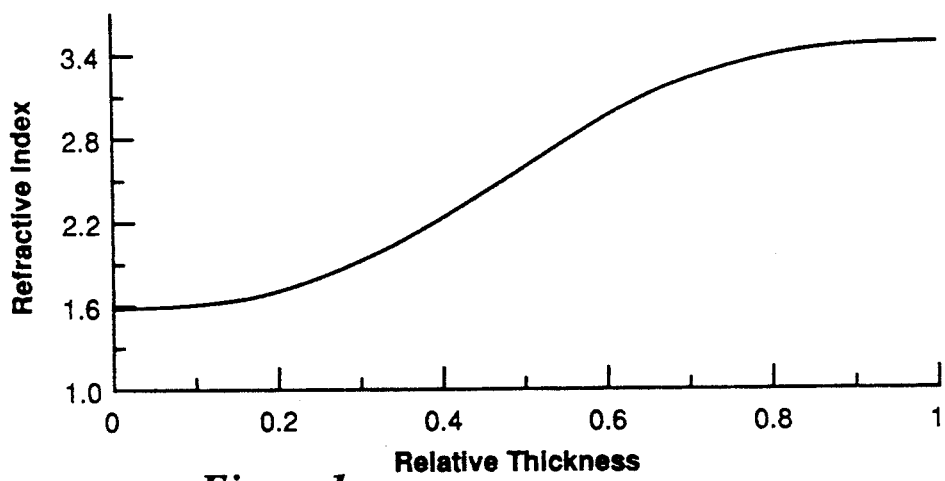
FIG. 1 is a graphical profile of the light absorbing coating of the present invention showing a continuously graded refractive index of the material.

FIG. 1 is a graphical representation of the refractive index of a continuously graded light absorbing layer of the present invention. The gradient in the refractive index profile of the absorbing layer maintains the film free of reflective interfaces. As illustrated in FIG. 1, the refractive index of the absorbing film matches the refractive index of the substrate at one surface (i.e., at a relative thickness of 1) as well as the refractive index of the optical medium at the other surface (i.e., at a relative thickness of 0). The refractive index of the absorbing layer could remain constant throughout the layer (i.e., with no interfaces) as long as the extinction coefficient of the layer increases in a quintic fashion.

Figure 2:
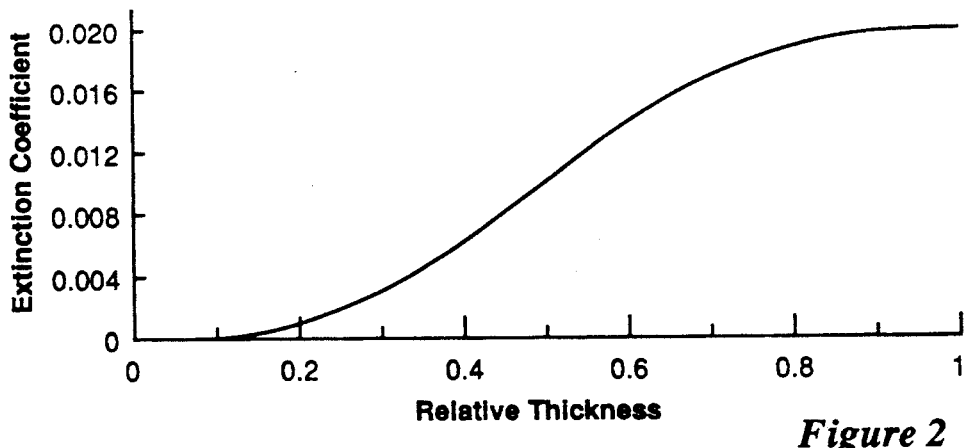
FIG. 2 is a graphical representation of the continuously graded extinction coefficient profile of the light absorbing layer of the present invention.

FIG. 2 is a graph of the extinction coefficient of the continuously graded light absorbing layer of FIG. 1. FIG. 2 illustrates that the extinction coefficient of the absorbing layer is graded continuously in a quintic fashion from zero (i.e., non-absorbing at the surface of the film) to a higher value (i.e., very absorbing at the substrate). As light traverses this film from the surface (i.e., relative thickness=0) to the substrate (i.e., relative thickness=1), which is from left to right in FIG. 2, the light is absorbed to an ever greater extent without encountering layer interfaces (in either refractive index or extinction coefficient) that would cause reflection of light back toward the surface of the film.

Figure 3:
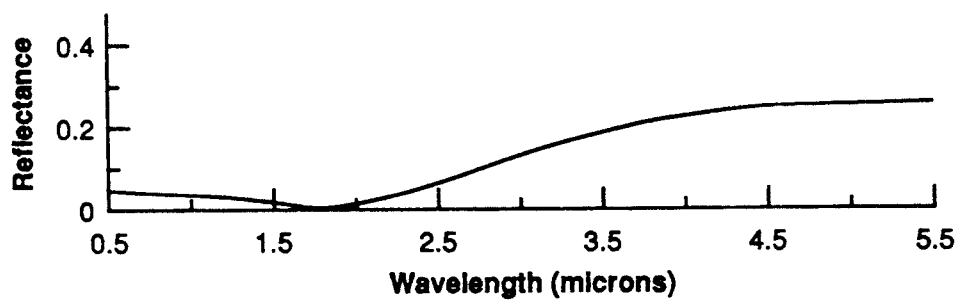
FIG. 3 is a graphical representation of the reflectance of the absorbing layer of the present invention versus the wavelength of incident light.

FIG. 3 is a graph of the reflectance of the light absorbing layer of FIG. 1 illustrating the broad band light absorbing characteristics of the continuously graded thin film layer.

Figure 4:
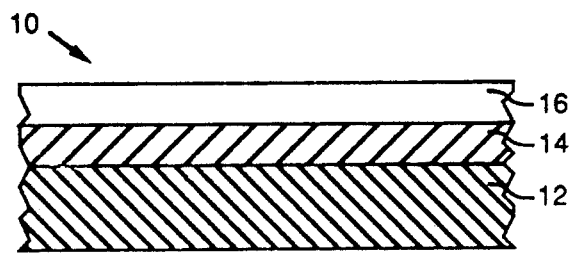
FIG. 4 is a schematic diagram illustrating an absorbing layer of the present invention deposited on a substrate, with a spectrally selective reflective layer deposited atop the absorbing layer.

FIG. 4 illustrates use of the absorbing layer of the present invention in a reflective device designed for reflecting only predetermined, narrow wavelength bands of light. Spectrally selective mirror 10 is fabricated on a supportive substrate 12. Broad band light absorbing layer 14 of the present invention is deposited atop substrate 12 using the continuously graded codeposition process described above. A reflective layer 16 that is spectrally selective is deposited atop absorbing layer 14. Layer 16 may comprise a rugate filter, for example, as described in U.S. Pat. No. 5,004,308 which is incorporated herein by reference. Layer 16 of spectrally selective mirror 10 functions to reflect predetermined, narrow wavelength bands of incident light and transmit the remaining broad band incident radiation. The radiation transmitted by layer 16 is absorbed in layer 14 so as not to cause reflection of unwanted wavelengths of radiation by the substrate or interfaces of the layers.

Although the present invention has been described with respect to specific embodiments thereof, various changes and modifications can be carried out by those skilled in the art without departing from the scope of the invention. Therefore, it is intended that the present invention encompass such changes and modifications as fall within the scope of the appended claims.

We claim:

1. A light absorbing structure, comprising:
   a light absorbing material deposited on a substrate;
   a non-absorbing material codeposited on said substrate with said absorbing material; and
   said absorbing and non-absorbing materials codeposited to form a thin film having a composition with a gradient from said absorbing material to said non-absorbing material.

2. The light absorbing structure of claim 1, wherein said light absorbing material comprises a metal and said non-absorbing material comprises a dielectric.

3. The light absorbing structure of claim 2, wherein said metal comprises chromium and said non-absorbing dielectric comprises silicon monoxide.

4. The light absorbing structure of claim 1, wherein said gradient comprises a continuous quintic profile.

5. The light absorbing structure of claim 4, wherein the portion of said light absorbing material in said continuous quintic profile is expressed as $(10x^3 - 15x^4 + 6x^5)$, where x is the relative distance into the thin film such that x equals 0 at the surface of the film and x equals 1 at said substrate.

6. A thin film, broad band light absorbing composition, comprising:
   a light absorbing material deposited on a substrate;
   a non-absorbing material codeposited on said substrate with said absorbing material; and
   said absorbing and non-absorbing materials codeposited to form the thin film light absorbing composition with a gradient from said absorbing material to said non-absorbing material.

7. The broad band light absorbing composition of claim 6, wherein said light absorbing material comprises a metal and said non-absorbing material comprises a dielectric.

8. The broad band light absorbing composition of claim 7, wherein said metal comprises chromium and said non-absorbing dielectric comprises silicon monoxide.

9. The broad band light absorbing composition of claim 7, wherein said gradient comprises a continuous quintic profile.

10. The broad band light absorbing composition of claim 9, wherein the portion of said light absorbing material in said continuous quintic profile is expressed as $(10x^3 - 15x^4 + 6x^5)$, where x is the relative distance into the thin film such that x equals 0 at the surface of the thin film and x equals 1 at said substrate.

11. The broad band light absorbing composition of claim 10, wherein the thin film has a thickness on the order of a wavelength of light.

12. A spectrally selective mirror, comprising:
a substrate;
a light absorbing layer deposited on said substrate, said absorbing layer having a composition graded continuously between a light absorbing material and a non-absorbing material; and
a spectrally selective reflecting layer deposited atop said absorbing layer.

13. The spectrally selective mirror of claim 12, wherein said light absorbing material comprises a metal and said non-absorbing material comprises a dielectric.

14. The spectrally selective mirror of claim 13, wherein said metal comprises chromium and said non-absorbing dielectric comprises silicon monoxide.

15. The spectrally selective mirror of claim 12, wherein said continuously graded composition of said absorbing layer comprises a quintic profile.

16. The spectrally selective mirror of claim 15, wherein the portion of said light absorbing material in said quintic profile is expressed as $(10x^3 - 15x^4 + 6x^5)$, where x is the relative distance into said light absorbing layer such that x equals 0 at said reflecting layer and x equals 1 at said substrate.

17. The spectrally selective mirror of claim 16, wherein said light absorbing layer has a thickness on the order of a wavelength of light.

* * * * *